United States Patent
Khare et al.

(10) Patent No.: US 10,955,922 B2
(45) Date of Patent: Mar. 23, 2021

(54) SIMULATING TACTILE INFORMATION FOR HAPTIC TECHNOLOGY

(71) Applicant: International Business Machines Corporation, Armonk, NY (US)

(72) Inventors: Shreya Khare, Bangalore (IN); Parag Jain, Jabalpur (IN); Srikanth G. Tamilselvam, Chennai (IN); Senthil Kumar Kumarasamy Mani, Bangalore (IN); Sampath Dechu, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 15/825,195

(22) Filed: Nov. 29, 2017

(65) Prior Publication Data
US 2019/0163272 A1    May 30, 2019

(51) Int. Cl.
G06F 3/01     (2006.01)
G06Q 30/06    (2012.01)
G06F 3/0481   (2013.01)
G06F 3/0484   (2013.01)

(52) U.S. Cl.
CPC .......... *G06F 3/016* (2013.01); *G06F 3/04817* (2013.01); *G06F 3/04842* (2013.01); *G06Q 30/0643* (2013.01)

(58) Field of Classification Search
CPC ........ G06F 3/016; G06F 3/0488; G06F 3/041; G06F 2203/04809
See application file for complete search history.

(56) References Cited

U.S. PATENT DOCUMENTS

| | | | |
|---|---|---|---|
| 8,866,766 B2* | 10/2014 | Vartanian | G06F 3/016 345/173 |
| 9,013,426 B2 | 4/2015 | Cole et al. | |
| 9,058,056 B2 | 6/2015 | Mohammed et al. | |
| 9,373,188 B2 | 6/2016 | Amacker | |
| 9,619,029 B2* | 4/2017 | Lacroix | A63F 13/60 |
| 9,672,553 B2* | 6/2017 | Sundaresan | G06Q 30/0627 |
| 9,678,569 B2* | 6/2017 | Birnbaum | G06F 3/016 |
| 9,971,406 B2* | 5/2018 | Bombacino | G06F 16/5866 |
| 10,031,583 B2* | 7/2018 | Levesque | G06F 3/016 |
| 2002/0030663 A1* | 3/2002 | Tierling | A63F 13/06 345/156 |

(Continued)

OTHER PUBLICATIONS

Margherita Peruzzini, Electro-Tactile Device for Texture Simulation, Jul. 2012, IEEE, pp. 1-6 (Year: 2012).*

(Continued)

*Primary Examiner* — Justin S Lee
(74) *Attorney, Agent, or Firm* — Marcus Walker

(57) ABSTRACT

Embodiments of the present invention provide a method, a computer program product, and a system for generating a haptic signal representing a fabric composition. Embodiments of the present invention can be used to generate a haptic signal that is based on a user selection. For example, embodiments of the present invention can combine characteristic signals corresponding to a plurality of textiles to generate the haptic signal for output to a haptic device. Embodiments of the present invention can be used to recommend similar fabric compositions based upon similarity between a characteristic signal of a fabric composition and the haptic signal.

17 Claims, 7 Drawing Sheets

(56) References Cited

U.S. PATENT DOCUMENTS

| | | | |
|---|---|---|---|
| 2009/0227296 A1* | 9/2009 | Kim | G06F 3/016 455/566 |
| 2009/0322498 A1* | 12/2009 | Yun | G06F 3/016 340/407.2 |
| 2010/0231367 A1* | 9/2010 | Cruz-Hernandez | G06F 3/016 340/407.2 |
| 2010/0231541 A1* | 9/2010 | Cruz-Hernandez | G06F 3/016 345/173 |
| 2011/0157052 A1* | 6/2011 | Lee | G06F 1/1626 345/173 |
| 2011/0248916 A1* | 10/2011 | Griffin | G06F 3/016 345/157 |
| 2012/0028577 A1* | 2/2012 | Rodriguez | H04N 21/44008 455/41.1 |
| 2014/0139450 A1* | 5/2014 | Levesque | G06F 3/016 345/173 |
| 2014/0210758 A1* | 7/2014 | Park | G06F 3/016 345/173 |
| 2014/0281954 A1 | 9/2014 | Ullrich et al. | |
| 2014/0310131 A1 | 10/2014 | Sundaresan et al. | |
| 2014/0375580 A1* | 12/2014 | Peshkin | G06F 3/016 345/173 |
| 2015/0106241 A1 | 4/2015 | Lucido | |
| 2015/0212578 A1 | 7/2015 | Lor et al. | |
| 2015/0268726 A1* | 9/2015 | Saboune | G06F 3/017 345/156 |
| 2015/0301604 A1* | 10/2015 | Cho | G06F 3/0416 715/702 |
| 2017/0131772 A1* | 5/2017 | Choi | H04M 19/04 |
| 2018/0046250 A1 | 2/2018 | Bhaskaran et al. | |

OTHER PUBLICATIONS

Bau et al., "Revel: Tactile Feedback Technology for Augmented Reality", ACM Transactions on Graphics, vol. 31, 4, Article 89, Publication Date: Jul. 2012, DOI= 10.114512185520.2185585, © 2012ACM 0730-0301/2012/08-ART89 DOI 10.114512185520.2185585, 11 pages.

Cunningham, Katelan, "How Do I Look?" This Smart Fitting Room Can Tell You, Jun 21, 2014, © 2017 Brit Media, Inc. All rights reserved, 13 pages, <https://www.brit.co/connected-fitting-room/>.

* cited by examiner

SIMULATING TACTILE INFORMATION FOR HAPTIC TECHNOLOGY

BACKGROUND

The present invention relates generally to the field of augmented reality, and more particularly to haptic technology.

Online shopping for fashion has increased in popularity in recent times. Digital transmissions of photographs and digital representations of clothing through the Internet allows shoppers to browse clothing and apparel in the comfort of their homes. Current online shopping allows for a user to virtually try, mix, and match various clothing and apparel in order to appreciate and better decide for an online purchase. Additionally, haptic technology has been developed such that a haptic device gives a user a sense of touch with computer-generated environments, so that when a user interacts with a virtual object, the virtual object seems to be real and tangible. Various forms of haptic devices use vibrations or force feedback to alert a user of a virtual or otherwise unseen object, such as user control vibrations for an aircraft when the aircraft is approaching a stall, force feedback for excavators when excavating mixed material such as rocks embedded in silt or clay, or a combination of force feedback and vibration for a gaming controller when a user interacts with the virtual world of a game. Recent developments in haptic technology include reverse electrovibration where an oscillating low-level electric signal passes between the skin of a user and a conductive surface covered with a thin insulating layer, wherein the oscillating electric signal corresponds to texture variations of an object, resulting in the user perceiving the texture of a simulated object.

SUMMARY

Embodiments of the present invention disclose a method, a computer program product, and a system for generating a haptic signal representing a fabric composition, and recommending similar fabric compositions. In one embodiment of the present invention, a method is provided comprising: receiving a selection from a user, wherein the selection corresponds to a characteristic signal, wherein the characteristic signals correspond to either a texture or a textile; generating a haptic signal comprising an oscillating low-level electric signal to be emitted by a haptic device, wherein the oscillating low-level electric signal passes between the skin of the user and a conductive surface covered with a thin insulating layer based, at least in part, on the user selection; and presenting the selection in a user interface having one or more graphical icons the user can further interact with to refine the haptic signal.

DETAILED DESCRIPTION

Figure 1:
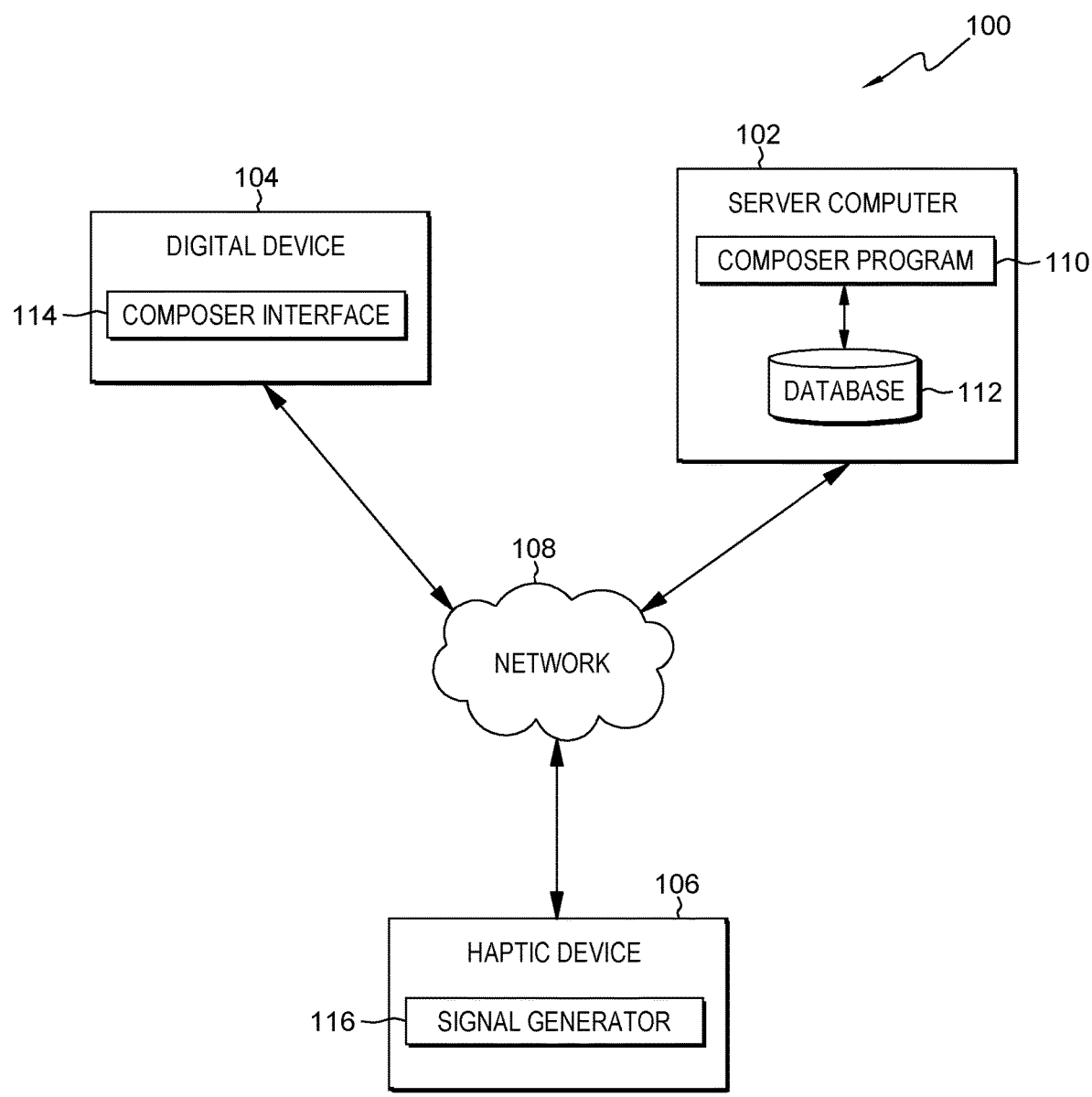
FIG. 1 is a functional block diagram illustrating a composition environment, in accordance with an embodiment of the present invention.

Embodiments of the present invention recognize that it is difficult to determine the texture of a fabric without touching physically touching the fabric. Online shopping has several challenges in translating an in-store experience since online shopping restricts users to a virtual representation of a product, where, upon receiving the physical product, it is probable the user will return the product because the product is the wrong size, is of poor quality, or is composed of an uncomfortable fabric. Additionally, it is difficult for a designer to judge the texture of a composite textile without manufacturing a sample of the composite textile. Embodiments of the present invention provide solutions for generating a haptic signal for a reverse electrovibration device, where the haptic signal represents a composite fabric based, at least in part, upon a selected composition from a user. For example, embodiments of the present invention include an interface capable of providing a vehicle for user selections to select fabrics with pre-defined haptic signals and can enable blending of fabric signals. Certain embodiments of the present invention can generate unique haptic signals for user selections, and can recommend fabric compositions based upon similarity between the user selection and existing fabrics that have an associated haptic signal (e.g., a manufactured fabric containing 65% polyester and 35% cotton has an associated haptic signal for reverse electrovibration that simulates the same fabric).

For example, a user can select a fabric composition based on specific textiles on a digital device such that a selection of 40% cotton and 60% silk can be combined by an embodiment of the present invention using associated haptic signals of 40% cotton and 60% silk into an electrical signal for a haptic device. The haptic device can then allow the user to touch a haptic surface and sense a virtual fabric that simulates a composition of 40% cotton and 60% silk. In another example, a user can select a fabric composition based on texture adjectives of a textile on a digital device such that a selection of 40% soft and 60% silky can be combined by an embodiment of the present invention using associated haptic signals of 40% soft and 60% silky into an electrical signal for a haptic device. The haptic device can then allow the user to touch a haptic surface and sense a virtual fabric that simulates a composition of 40% soft and 60% silky, and can then recommend textiles that match the user selection. Implementation of embodiments of the invention may take a variety of forms, and exemplary implementation details are discussed subsequently with reference to the Figures.

Embodiments of the present invention can be incorporated into a haptic device or otherwise accessed by the haptic device to provide the haptic device with the functionality described above (which was previously not capable of performing). A haptic device can include one or more sensors and circuits to simulate electric signals for reverse electrovibration. A haptic device using reverse electrovibration generally includes an interactive surface, which includes a non-conductive substrate (e.g., glass), a conducting electrode layer, and an insulating layer that forms as a resistive barrier between the electrode and the user. In some cases, the interactive layer can have sensors that detect a location where the user is touching (e.g., a touch screen). A haptic device also includes a signal generator (and in some cases a signal amplifier to boost a signal from the signal generator) to drive a haptic signal. A user, an interactive surface, and a signal generator form a circuit with either the haptic signal being supplied from the user side or from the interactive surface side. For example, a haptic signal is driven from a signal generator to an interactive surface, where then a user touching the interactive surface serves as an electrical ground for the haptic signal. In an alternate example, a haptic signal is driven from a signal generator to a user, where then an interactive surface serves as an electrical ground for the haptic signal when the user touches the interactive surface.

FIG. 1 is a functional block diagram illustrating a composition environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Composition environment 100 includes server computer 102, digital device 104, haptic device 106, all interconnected over network 108. Server computer 102, digital device 104, and haptic device 106 can be a standalone computing device, a management server, a web server, a mobile computing device, or any other electronic device or computing system capable of receiving, sending, and processing data. In other embodiments, server computer 102, digital device 104, and haptic device 106 can represent a server computing system utilizing multiple computers as a server system, such as in a cloud computing environment. In another embodiment, server computer 102, digital device 104, and haptic device 106 can be a laptop computer, a tablet computer, a netbook computer, a personal computer (PC), a desktop computer, a personal digital assistant (PDA), a smart phone, or any other programmable electronic device capable of communicating with digital device 104, haptic device 106, and other computing devices (not shown) within composition environment 100 via network 108. In another embodiment, server computer 102, digital device 104, and haptic device 106 represents a computing system utilizing clustered computers and components (e.g., database server computers, application server computers, etc.) that act as a single pool of seamless resources when accessed within composition environment 100. In some embodiments, server computer 102, digital device 104, and haptic device 106 can operate together as a single device, can operate separately as stand-alone devices, or can be in any combination thereof. Server computer 102, digital device 104, and haptic device 106 may include internal and external hardware components capable of executing machine-readable program instructions, as depicted and described in further detail with respect to FIG. 4.

Server computer 102 includes composer program 110 and database 112. Composer program 110 can generate haptic signals for haptic feedback, and is capable of recommending fabrics based upon a user selection. In this embodiment, composer program 110 provides the capability of generating a haptic signal representing a composite fabric based, at least in part, upon a user selection, and sends the haptic signal to a haptic device to simulate the tactile sense of the composite fabric for the user. The haptic signal is a combination of characteristic signals of a plurality of textiles selected by a user that composer program 110 combines into a signal that simulates the tactile sense of the plurality of textiles. A characteristic signal is an electrical signal used for reverse electrovibration in haptic feedback technology, and is associated with a texture sensation of a particular existing fabric. For example, a common manufactured fabric contains 65% polyester and 35% cotton. The characteristic signal of the 65% polyester and 35% cotton fabric is an electrical signal that simulates 65% polyester and 35% cotton fabric on a haptic device. A characteristic signal can also be an electrical signal associated with a texture adjective of a textile. For example, a characteristic signal that is defined as soft or smooth has an electric signal that simulates a soft or smooth fabric on a haptic device.

Composer program 110 combines characteristic signals into a haptic signal. For example, a user selects on digital device 104 that the user wants to experience what a composition composed of 40% cotton, 40% spandex, and 20% silk feels like. Composer program 110 receives the composition selected by the user from digital device 104, and generates a haptic signal to haptic device 106 that simulates the tactile sense of a fabric composed of 40% cotton, 40% spandex, and 20% silk. In a further embodiment, composer program 110 provides the capability of recommending a set of fabrics that have a similar characteristic signal with the haptic signal based upon user selection. For example, based upon a user selection, composer program 110 can provide a list of fabrics that are similar in touch based upon similar haptic signals that are stored on database 112. Composer program 110 is depicted and described in further detail with respect to FIG. 2.

Database 112 is a repository for data used by composer program 110. Database 112 can be implemented with any type of storage device capable of storing data and configuration files that can be accessed and utilized by server computer 102, such as a database server, a hard disk drive, or a flash memory. Database 112 stores a plurality of characteristic signals corresponding to a plurality of textiles that simulates the tactile sense via haptic device 106, wherein the plurality of characteristic signals stored on database 112 correspond to a signal that emulates, but is not limited to, cotton, denim, silk, linen, wool, leather, spandex, acrylic, nylon, velvet, polyester, or any known combination thereof. Database 112 can also store custom signals that correspond to articles of clothing, wherein the custom signal consists of a combination of characteristic signals and corresponding proportionality. For example, database 112 can have a custom signal called "denim cotton shirt 2016 edition" wherein the custom signal is composed of the characteristic signals and corresponding proportionality of 98% cotton and 2% polyester. Furthermore, database 112 can store custom signals created and stored by the user, so that the custom signals can be used a haptic signal for a later time, or combined with other characteristic signals with variable proportionalities at a later time. Custom signals can be stored as part of wardrobe library located on database 112.

Digital device 104 is a device that has input controls and a display to allow user interaction with composer interface 114, and allows composer program 110 to receive user selections processed by composer interface 114. Digital device 104 includes composer interface 114. Composer interface 114 is an interactive display that allows a user to make selections for processing by composer program 110. In general, composer interface 114 displays a user interface having one or more graphical icons the user can interact with to make textile and/or texture selections for composer program 110 to generate a haptic signal. For example, composer interface 114 can include graphical icons that, when selected, is capable of allowing a user to select a specific fabric having an associated haptic signal, allowing a user to select a blend of fabrics that have a corresponding haptic signal to be combined by composer program 110, and displaying for a user recommended fabrics based upon a texture selection as described in greater detail with regard to FIG. 4.

Haptic device 106 is any device that simulates the tactile sense, and can be produced by, but is not limited to, reverse electrovibration technologies. Haptic device 106 includes signal generator 116 that is capable of receiving wave functions that have varying wave forms (e.g., varying frequency/wavelengths and amplitudes) as electrical signals from digital device 104, and, in turn, scales (i.e., amplifies voltage, current, etc.) and emits another electrical signal such that it allows a haptic feedback sensation for a user. Haptic device 106 can be made to any optimal specification for receiving haptic feedback mimicking. Haptic device 106 can be arranged as a wearable set of surfaces such that, when worn by a user, allows the user to feel the textures of a simulated fabric across the body of a user. For example, a user can select a fabric to be simulated by composer program 110 and wear haptic device 106 as a shirt, thus allowing the user to feel the texture of the simulated fabric as a shirt composed of the selected texture.

Network 108 can be, for example, a telecommunications network, a local area network (LAN), a wide area network (WAN), such as the Internet, or a combination of the three, and can include wired, wireless, or fiber optic connections. Network 108 can include one or more wired and/or wireless networks that are capable of receiving and transmitting data, voice, and/or video signals, including multimedia signals that include voice, data, and video information. In general, network 108 can be any combination of connections and protocols that will support communications among server computer 102, digital device 104, haptic device 106, and other computing devices (not shown) within composition environment 100.

For illustrative purposes, the following discussion is made with respect to composer program 110 and database 112 residing on one computing device (e.g., server computer 102), signal generator 116 residing on another computing device (e.g., haptic device 106), and composer interface 114 residing on yet another computing device (e.g., digital device 104). However, it should be understood that composer program 110, database 112 signal generator 116 and composer interface 114 can reside on the same computing device and can be configured to any combination optimal for providing a vehicle for user selections to select fabrics with pre-defined haptic signals, generating unique haptic signals, blending of fabric signals, and recommending fabric compositions based upon similarity between the user selection and existing fabrics that have an associated haptic signals.

Figure 2:
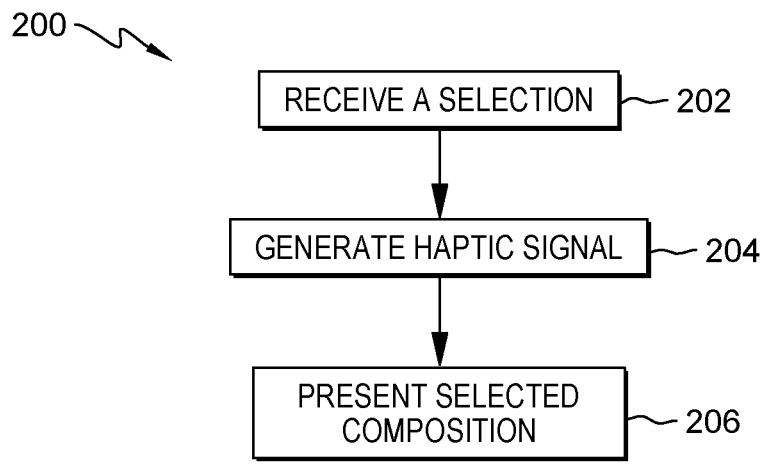
FIG. 2 is a flowchart depicting operational steps for generating a haptic signal representing a composite fabric, in accordance with an embodiment of the present invention.

FIG. 2 is flowchart 200 depicting operational steps for generating a haptic signal representing a composite fabric, in accordance with an embodiment of the present invention.

Composer program 110 receives a selection made by a user (S202). In this embodiment, composer program 110 receives a selection made by a user by accessing the selection from digital device 104, wherein the selection contains a plurality of textile names or texture names, and a corresponding proportionality for the plurality of textile or texture names. For example, the user can access the graphical interface of composer program 110 (e.g., composer interface 114) to make selections. If the user selects on digital device 104 a composition composed of 40% cotton, 40% spandex, and 20% silk, then composer program 110 receives the selection: 40% cotton, 40% spandex, and 20% silk. In other embodiments, composer program 110 can receive a selection made by the user from one or more other components of composition environment 100.

In an alternate embodiment, the selection can contain a single textile or texture without a corresponding proportionality (as a single selection defaults to a proportionality of 100%). For example, if the user selection on digital device 104 is a single texture selection of cotton, composer program 110 receives cotton as the selection. In another alternate embodiment, the selection can contain a plurality of textile names or texture names, but not a corresponding proportionality for the plurality of textile or texture names. For example, if the user selection on digital device 104 is soft, smooth, and mesh, but the user does not select a corresponding proportionality, then composer program 110 receives soft, smooth, and mesh as the selection.

In yet another alternate embodiment, the selection can be an article of clothing from a wardrobe library stored on database 112. For example, if the user selection on digital device 104 is "denim cotton shirt 2016 edition", wherein "denim cotton shirt 2016 edition" is stored on database 112 as a custom signal composed of 98% cotton and 2% polyester, then composer program 110 receives "denim cotton shirt 2016 edition" as the selection (i.e., composer program 110 receives 98% cotton and 2% polyester. The user can then adjust the proportionality of these characteristic signals to be used as a haptic signal as described by the operations laid out below).

Composer program 110 generates a haptic signal (S204). In this embodiment, composer program 110 generates a haptic signal using a plurality of characteristic signals by acquiring the plurality of characteristic signals, combining the plurality of characteristic signals into a haptic signal based, at least in part, on the corresponding proportionality, and transmitting the haptic signal to a haptic device. In certain other embodiments, composer program 110 can generate unique haptic signals based upon received user selected characteristics as described in greater detail with regards to FIG. 3, flowchart 300.

In one embodiment, composer program 110 generates a haptic signal by combining characteristic signals corresponding to textiles selected by a user. In this embodiment, composer program 110 combines the characteristic signals corresponding to textiles based, at least in part, on a corresponding proportionality selected by a user. For example, a user would like to compose and feel a blend of fabrics such that the resulting simulated fabric is 60% cotton, 20% polyester, and 20% rayon. Composer program 110 can acquire a characteristic signal for cotton, polyester, and rayon; scale the characteristic signal of each fabric by 60%, 20%, and 20% respectively, combine the scaled characteristic signals, and output a haptic signal that simulates a fabric composed of 60% cotton, 20% polyester, and 20% rayon.

In another embodiment, composer program 110 generates a haptic signal by combining characteristic signals corresponding to texture adjectives selected by a user. In this embodiment, composer program 110 combines the characteristic signals of texture adjectives based, at least in part, on a corresponding proportionality selected by a user. For example, a user would like to compose and feel a blend of textures such that the resulting simulated fabric is 60% soft, 20% smooth, and 20% mesh. Composer program 110 can acquire a characteristic signal for each of soft, smooth, and mesh; scale the characteristic signal for each texture by 60%, 20%, and 20% respectively, combine the scaled characteristic signals, and transmit a haptic signal that simulates a fabric that is 60% soft, 20% smooth, and 20% mesh.

In a further embodiment, composer program 110 generates a haptic signal by combining characteristic signals corresponding to texture adjectives and textiles. For example, a user can select 50% cotton (i.e., a textile) and 50% mesh (i.e., a texture) on digital device 104, and composer program 110 can generate a haptic signal that combines the characteristic signals of 50% cotton and 50% mesh.

In further embodiment, composer program 110 generates a haptic signal by combining characteristic signals corresponding to texture adjectives and textiles without a corresponding proportionality selected by a user. For example, a user can select soft, smooth, and mesh on digital device 104 to be generated as a haptic signal by composer program 110; however, the user does not select a corresponding proportionality for each of soft, smooth, and mesh. Composer program 110 can acquire a characteristic signal for each of soft, smooth, and mesh; scale the amplitudes of each of the characteristic signals of soft, smooth, and mesh, wherein the scale is a normalized scaling based upon the number of characteristic signals selected by the user such that each selection carries equal weight, combine the scaled characteristic signals, and transmit a haptic signal that simulates a fabric that is soft, smooth, and mesh. For example, if the user selects three characteristic signals, composer program 110 scales the amplitude of each of the signals by 33.3%. If the user selects four characteristic signals, then composer program 110 scales the amplitude of each of the signals by 25%. If the user selects five characteristic signals, then composer program 110 scales the amplitude of each of the signals by 20% and so on. From there, composer program 110 can combine the scaled characteristic signals, and transmit a haptic signal that simulates a fabric that is soft, smooth, and mesh. Based upon this example, composer program 110 scales the amplitudes of the characteristic signals of soft, smooth, and mesh are each scaled by 33.3%.

In another embodiment, if a user selects only one textile or texture, then composer program 110 generates a haptic signal corresponding to the one textile or texture selected by the user. In this embodiment, composer program 110 simply acquires a characteristic signal corresponding to the user selection, and outputs the characteristic signal as the haptic signal. For example, if a user only selects cotton, then composer program 110 acquires the characteristic signal for cotton (with proportionality defaulting to 100%), and outputs a haptic signal that simulates a fabric that is 100% cotton.

Composer program 110 presents the selected composition (S206). In this embodiment, composer program 110 presents the selected composition that corresponds to the haptic signal by displaying the selected composition on digital device 104. For example, composer program 110 can display on a user interface, the selection made by the user. In this example, the user selection would generate a haptic signal that simulates a fabric composed of 40% cotton, 40% spandex, and 20% on digital device 104 for the user as described in greater detail with regard to FIG. 4A. In a further embodiment, composer program 110 presents a recommended set of fabrics based upon characteristic signals stored on database 112 similar to the haptic signal. For example, composer program 110 displays 40% cotton, 40% spandex, and 20% silk which correlates to the selection of the user. Composer program 110 also displays a recommended fabric that has 40% cotton and 80% spandex due to it having a characteristic signal similar to the haptic signal.

In another further embodiment, after receiving the presented selection, a user can make further selections to refine the generated haptic signal. For example, a user makes a first selection of 95% cotton and 5% spandex on a user interface for composer program 110 to generate as a haptic signal. Composer program 110 generates the haptic signal and displays the first selection on the user interface. The user experiences, through haptic device 106, the haptic signal representing the first selection, but then later the user decides to make a second selection to subsequently adjust the haptic signal. The user selects on the user interface a second selection of 90% cotton and 10% spandex for composer program 110 to generate as the haptic signal. Composer program 110 generates the haptic signal and displays the second selection, and the user subsequently experiences, through haptic device 106, the haptic signal representing the second selection.

Figure 3:
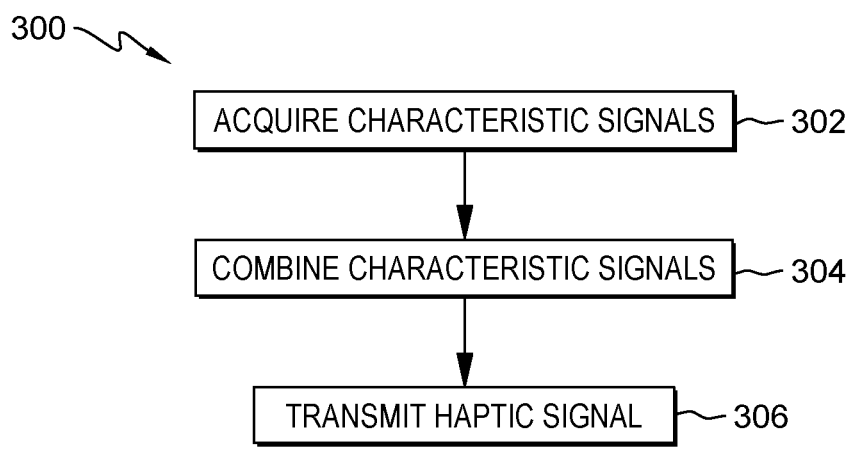
FIG. 3 is a flowchart depicting operational steps of a signal generation process, in accordance with an embodiment of the present invention.

FIG. 3 is flowchart 300 depicting operational steps of a signal generation process, in accordance with an embodiment of the present invention.

Composer program 110 acquires a plurality of characteristic signals (S302). In this embodiment, composer program 110 acquires a plurality of characteristic signals corresponding to the selected composition from digital device 104 (obtained in operation S202) by retrieving the plurality of characteristic signals from database 112. For example, if the selected composition is 40% cotton, 40% spandex, and 20% silk, then composer program 110 acquires the characteristic signals of cotton, spandex, and silk from database 112.

Composer program 110 combines the plurality of characteristic signals (S304). In this embodiment, composer program 110 combines the plurality of characteristic signals to create a haptic signal by scaling a plurality of amplitudes corresponding to the plurality of characteristic signals by the corresponding proportionality, and summing the plurality of the characteristic signals by a signal wave summation (i.e., wave superposition). For example, composer program 110 combines the plurality of characteristic signals of the collected composition of 40% cotton, 40% spandex, and 20% silk by scaling the amplitude of the characteristic signal of cotton by 40%, the amplitude of the characteristic signal of spandex by 40%, and the amplitude of the characteristic signal of silk by 20%, and summing the three signals using a signal wave summation (i.e., wave superposition) to create a haptic signal.

In another example, composer program 110 combines the plurality of characteristic signals of the collected composition of 40% soft, 40% smooth, and 20% mesh by scaling the amplitude of the characteristic signal of soft by 40%, the amplitude of the characteristic signal of smooth by 40%, and the amplitude of the characteristic signal of mesh by 20%, and summing the three signals using a signal wave summation (i.e., wave superposition) to create a haptic signal.

In instances where composer program 110 receives a selection for only one textile or texture, then composer program 110 outputs the acquired characteristic signal as a haptic signal. For example, a user selects only cotton. Composer program 110 acquires the characteristic signal for cotton (with proportionality defaulting to 100%), and outputs a haptic signal that simulates a fabric that is 100% cotton.

Composer program 110 transmits the haptic signal (S306). In this embodiment, composer program transmits the haptic signal by electrically sending the haptic signal to haptic device 106, wherein the haptic device 106 is able to produce the tactile sensation that simulates the collected composition based in part on the haptic signal. For example, composer program 110 transmits the haptic signal that represents the collected composition of 40% cotton, 40% spandex, and 20% silk to haptic device 106, where then the user can feel the simulation of the selected composition via haptic device 106.

Figure 4A:
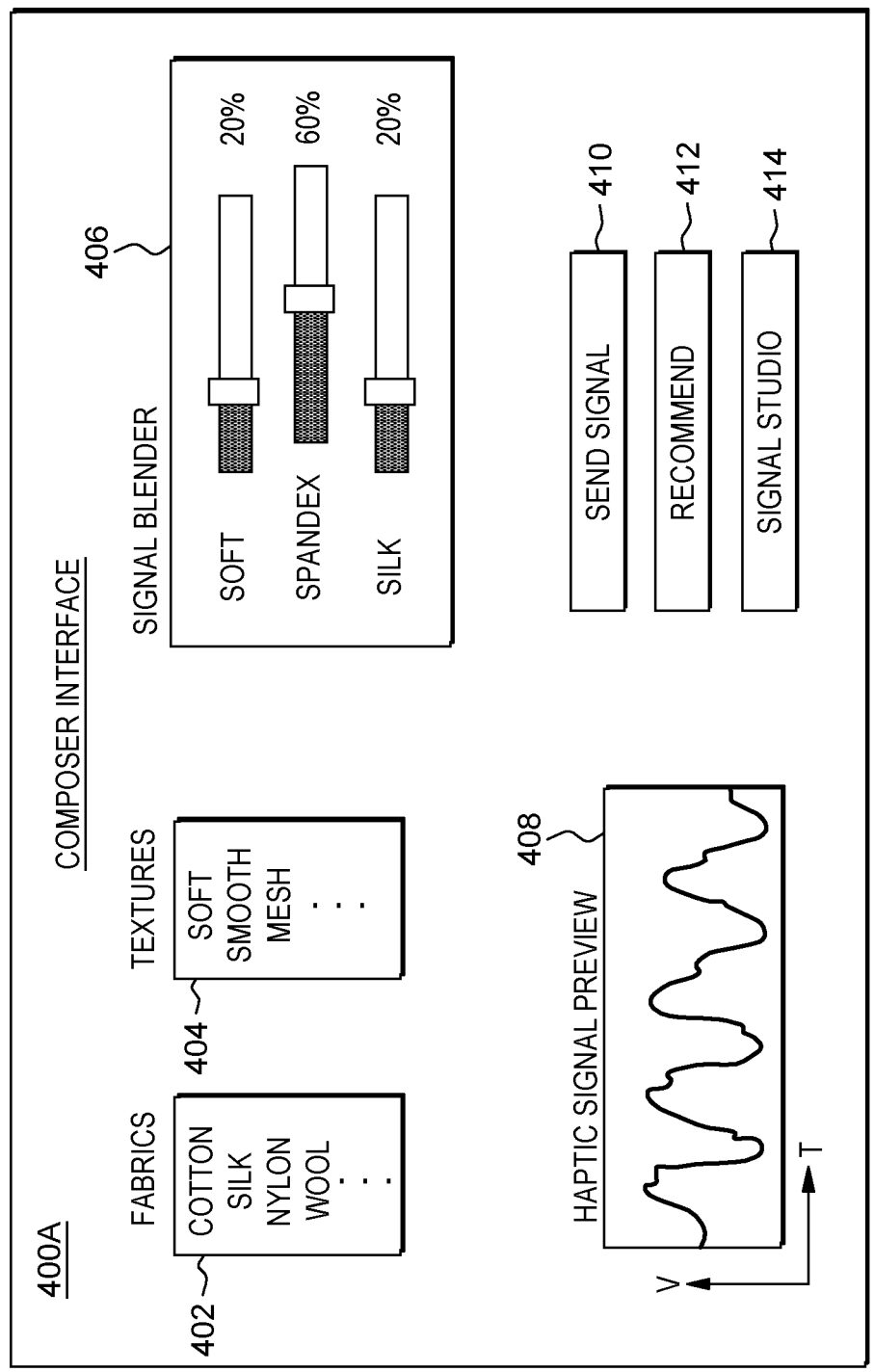
FIG. 4A is a screen shot example of an interactive graphical user interface for a composer interface main menu, in accordance with an embodiment of the present invention.
Figure 4B:
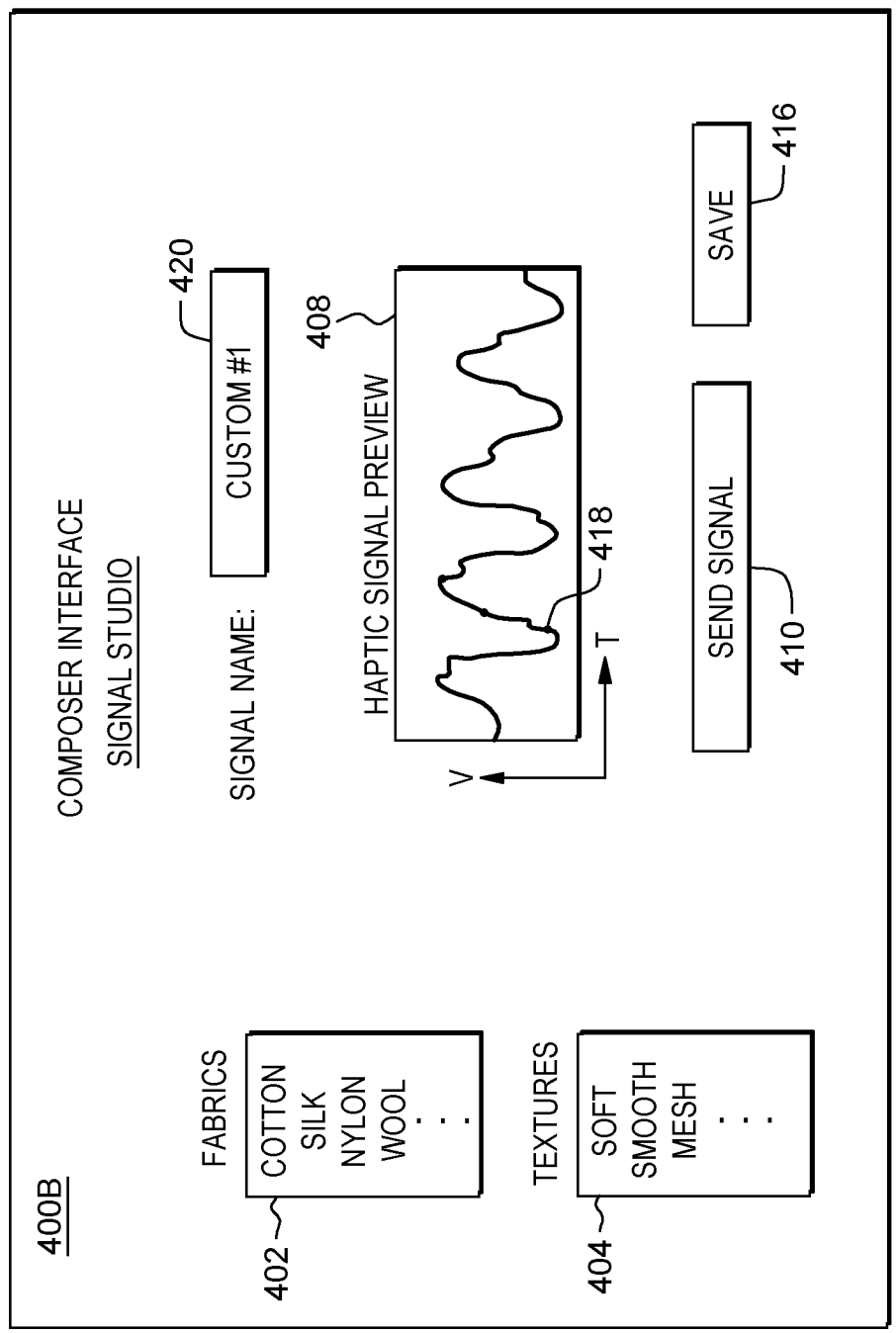
FIG. 4B is a screen shot example of an interactive graphical user interface for a composer interface signal studio menu, in accordance with an embodiment of the present invention.

FIGS. 4A and 4B are screen shot examples of an interactive graphical user interface 400 for a composer interface 114, in accordance with an embodiment of the present invention.

FIG. 4A displays an example composer interface 114 main menu that enables a user to select characteristic signals for generating a haptic signal.

In general, interactive graphical user interface 400 includes one or more graphical icons, one or more interactive graphical icons, interactive lists, and text input fields that are viewable to the user, and allow the user to interact with composer program 110. For example, interactive graphical user interface 400 can display an interactive list of fabrics that a user can select. In this example, interactive list 402 lists a variety of fabrics (e.g., cotton, silk, nylon, wool, etc.). In another example, interactive graphical user interface 400 can display an interactive list of textures that a user can select. In this example, interactive list 404 lists a variety of textures (e.g., soft, smooth, etc.). In another example, interactive graphical user interface 400 can display an interactive list of user signal selections and allows a user to select a proportion corresponding to each user signal selection for combining characteristic signals. In this example, interactive list 406 displays a user signal selection and allows a user to select a proportion corresponding to the user signal selection (e.g., the user has selected soft: 20%, spandex: 60%, and silk: 20%). In another example, interactive graphical user interface 400 displays a graphical representation of a haptic signal showing voltage-time relationship as a result of a user signal selection and a proportion corresponding to the user signal selection. In this example, graphical representation 408 displays a haptic signal as a result of a user selection. In another example, interactive graphical user interface 400 can display an interactive icon that allows a user to send a haptic signal selected by a user to a haptic device. In this example, interactive icon 410 sends a haptic signal to haptic device 106, subsequently allowing the user to experience the tactile sensation of the fabrics and textures the user selected.

In another example, interactive graphical user interface 400 can display an interactive icon that, when selected by a user, triggers composer program 110 to generate a list of recommended known fabrics that are similar to a haptic signal, wherein the list of recommended known fabrics can be based upon a curve fitting calculation or comparison in Fourier analysis between a user selection for a haptic signal and characteristic signals stored on database 112. In this example, interactive icon 412 causes composer program 110 to generate a list of fabrics similar to a haptic signal.

FIG. 4B displays an example composer interface 114 for a signal studio menu that enables a user to directly modify a graphical representation of a haptic signal through the use of interactive nodes.

In another example, interactive graphical user interface 400 can display an interactive icon that, when selected by a user, opens an interactive menu (i.e., "signal studio") that allows a user to directly manipulate a signal into a new custom signal as a haptic signal. In this example, interactive icon 414 opens a signal studio menu. In another example, interactive graphical user interface 400 can display an interactive icon that allows a user to save a haptic signal created by a user. In this example, interactive icon 416 allows a user to save a haptic signal. In another example, interactive graphical user interface 400 can display interactive nodes on a displayed haptic signal that enables a user to modify the signal by clicking and dragging nodes to a particular voltage and time. In this example, interactive node 418 allows a user to modify a haptic signal. In another example, interactive graphical user interface 400 can display an interactive text field that allows a user to name a haptic signal created by the user. In this example, interactive text field 420 displays a name chosen by a user that corresponds to a haptic signal created by the user (e.g., Signal Name: "Custom #1").

Figure 5A:
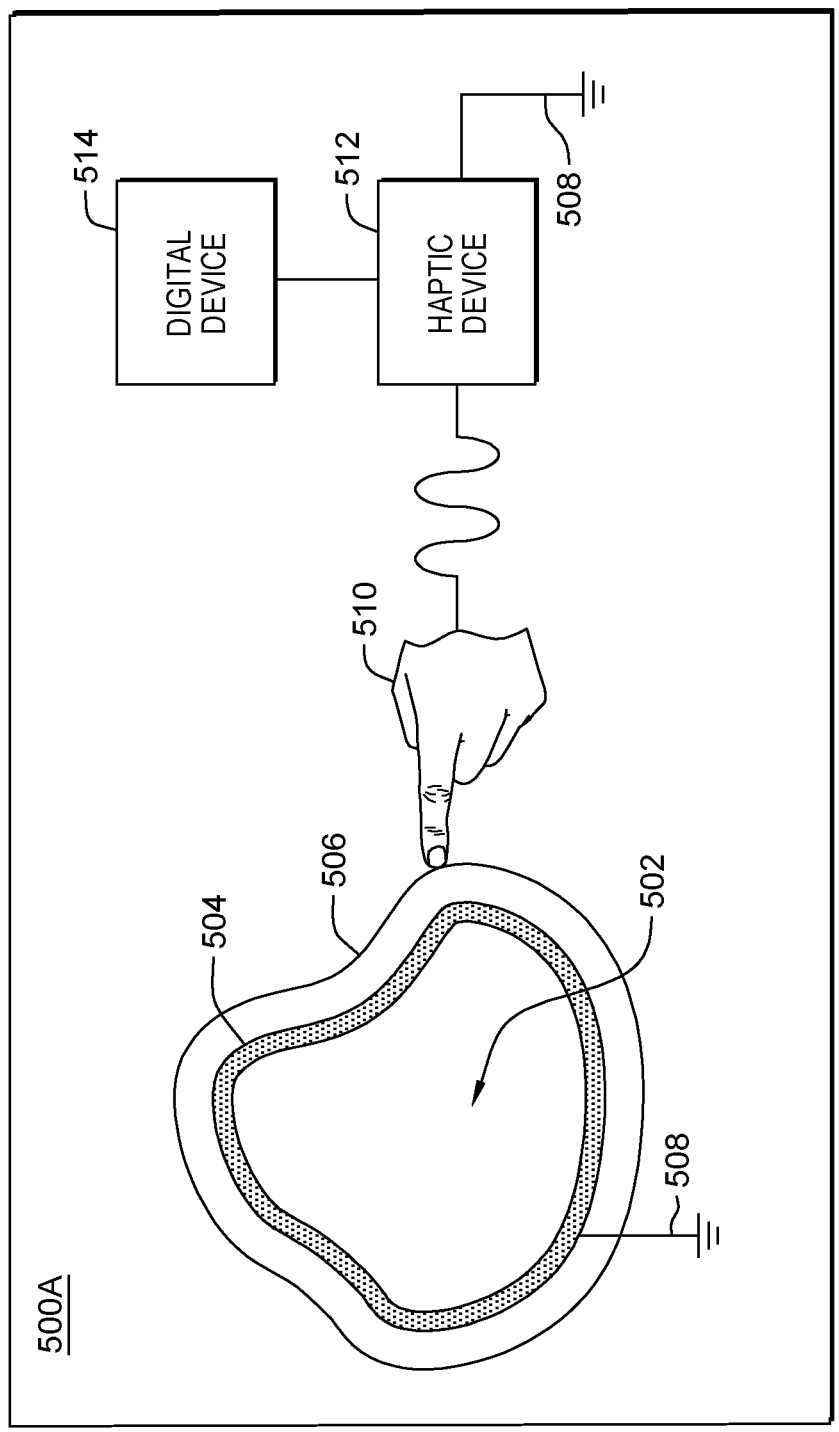
FIG. 5A is an embodiment example of a composition environment wherein a user is electrically connected to a haptic device, in accordance with an embodiment of the present invention.
Figure 5B:
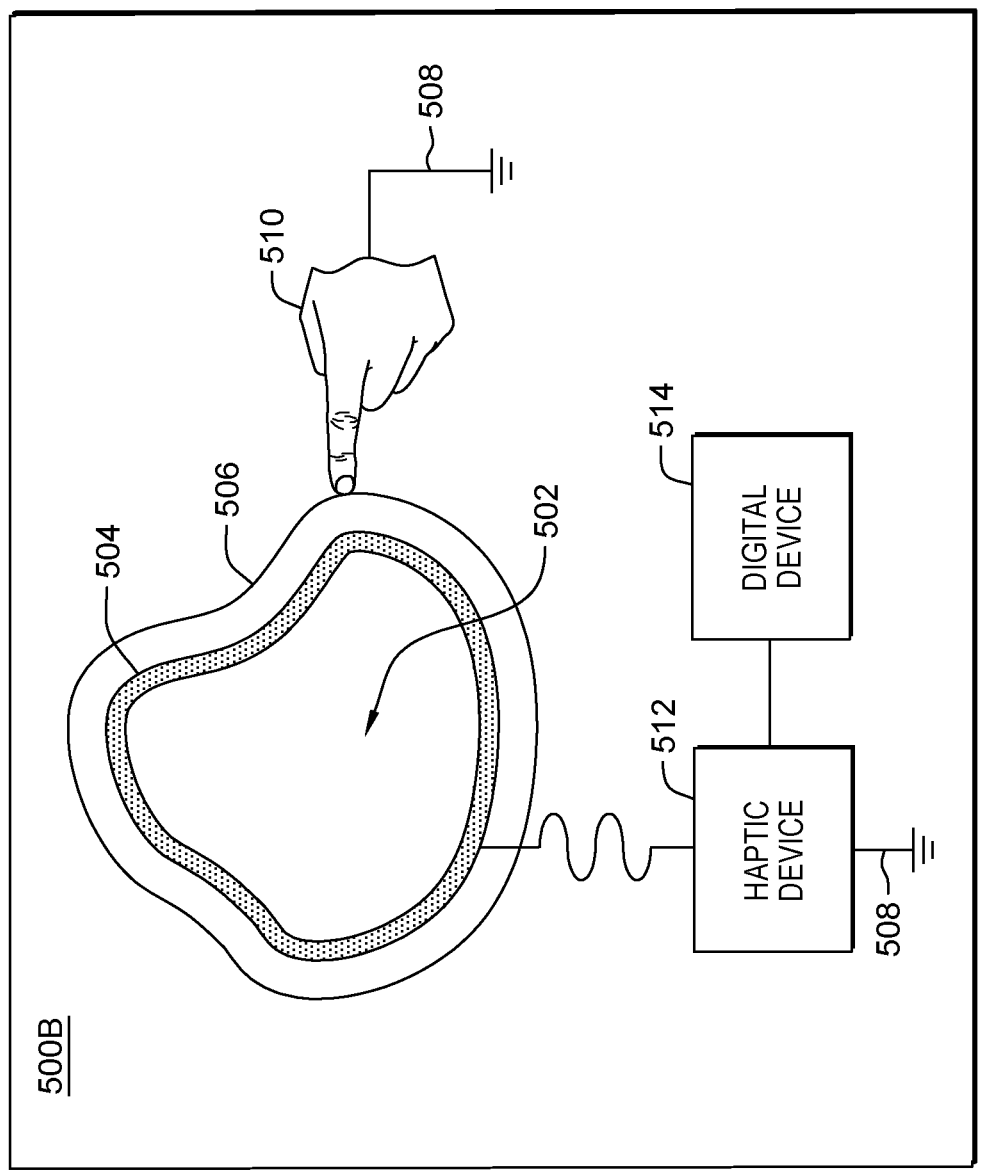
FIG. 5B is an embodiment example of a composition environment wherein a user is electrically connected to a ground, in accordance with an embodiment of the present invention.

FIGS. 5A and 5B are implementation examples of a composition environment 500A and 500B, in accordance with an embodiment of the present invention.

FIG. 5A demonstrates an embodiment wherein haptic device 512 is electrically connected to user 510, where then user 510 completes an electrical circuit by touching insulator 506, allowing electrical current to flow from user 510, to insulator 506, to conductor 504, and lastly to electrical ground 508. FIG. 5B demonstrates an embodiment wherein haptic device 512 is electrically connected to conductor 504 and is subsequently connected to insulator 506, where then user 510 completes an electrical circuit by touching insulator 506, allowing electrical current to flow from conductor 504, to insulator 506, to user 510, and lastly to electrical ground 508.

In general, implementation of a composition environment 500A and 500B includes one or more objects to serve as a base for a haptic simulation, a user, a haptic device, and a digital device containing composer program 110. For example, an implementation of a composition environment 500A and 500B contains base 502 for a haptic simulation, wherein the base acts as a structural "blank canvas" that a user interacts with in performing a haptic simulation. Base 502 also acts as an inert substrate for conductor 504 and insulator 506. In another example, implementation of a composition environment 500A and 500B contains conductor 504 that conducts, with low electrical resistance, electrical signals from user 510, through insulator 506, to electrical ground 508 of base 502. In another example, implementation of a composition environment 500A and 500B contains insulator 506 that conducts, with high electrical resistance, electrical signals passing between user 510 and conductor 504. In another example, implementation of a composition environment 500A and 500B has user 510 that is a receiving party of haptic feedback caused by a haptic signal. An oscillating low-level electric signal passes between haptic device 512 and insulator 506, causing an oscillating electric force between a point of contact between user 510 and insulator 506, where then the oscillating electric force simulates various textures user 510 can perceive. In another example, implementation of a composition environment 500A and 500B contains haptic device 512 that generates an oscillating low-level electric signal based upon a haptic signal received from digital device 514. Haptic device 512 is also connected to electrical ground 508. In another example, implementation of a composition environment 500A and 500B contains digital device 514 that further contains composer program 110. Digital device 514 outputs a haptic signal generated by composer program 110 to haptic device 512.

In the example embodiments shown by implementation example of a composition environment 500A and 500B, digital device 514 also contains (but not shown) composer interface 114 and server computer 102, wherein server computer 102 subsequently contains composer program 110 and database 112. Furthermore, haptic device 106 contains (but not shown) signal generator 116.

Figure 6:
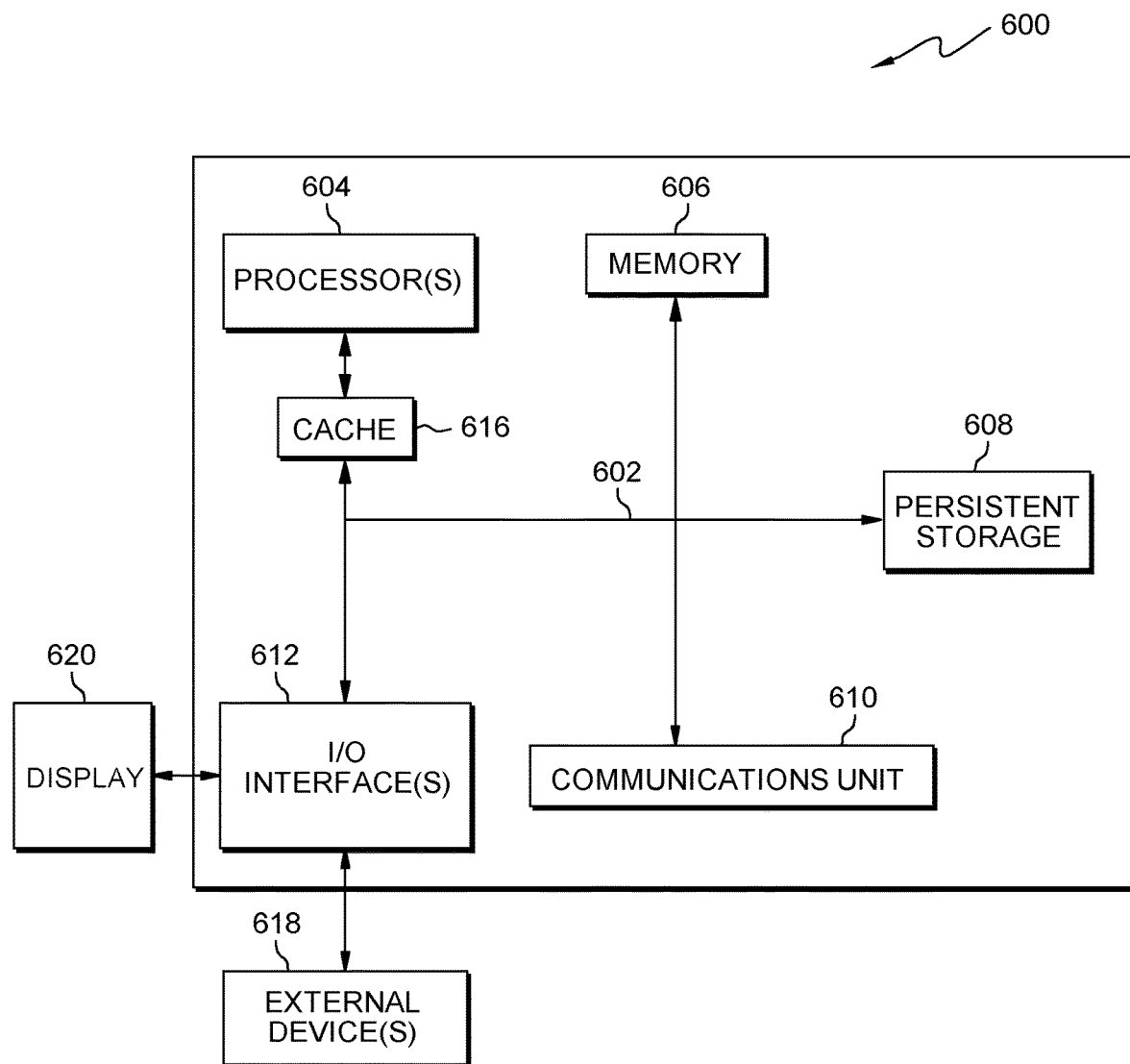
FIG. 6 depicts a block diagram of components of the computing systems of FIG. 1, in accordance with an embodiment of the present invention.

FIG. 6 depicts a block diagram of components of the computing systems within composition environment 100 of FIG. 1, in accordance with an embodiment of the present invention. It should be appreciated that FIG. 6 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 600 includes communications fabric 602, which provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Composer program 110 may be stored in persistent storage 608 and in memory 606 for execution by one or more of the respective computer processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Composer program 110 may be downloaded to persistent storage 608 through communications unit 610.

I/O interface(s) 612 allows for input and output of data with other devices that may be connected to server computer 102. For example, I/O interface 612 may provide a connection to external devices 618 such as a keyboard, keypad, a touch screen, and/or some other suitable input device. External device 618 can also include portable computer readable storage media such as, for example, thumb drives, portable optical or magnetic disks, and memory cards. Software and data used to practice embodiments of the present invention, e.g., Composer program 110, can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    receiving a selection from a user, wherein the selection corresponds to a characteristic signal, wherein the characteristic signals correspond to a texture and a textile of a composition of a fabric;
    generating a haptic signal comprising an oscillating low-level electric signal to be emitted by a haptic device, wherein the oscillating low-level electric signal passes between the skin of the user and a conductive surface covered with a thin insulating layer based, at least in part, on the user selection;
    presenting the selection in a user interface having one or more graphical icons the user utilizes to refine the haptic signal, wherein refining the haptic signal further comprises:
        modifying the characteristic signal of the selection using the one or more graphical icons; and
    generating a recommendation of one or more haptic signals based at least in part on the user-generated haptic signals and a database of characteristic signals, wherein the recommendation includes a list of comparable compositions of fabrics that correspond to the one or more haptic signals.

2. The computer-implemented method of claim 1, wherein the user selection further comprises a corresponding proportionality of the texture and the textile for the characteristic signal.

3. The computer-implemented method of claim 1, wherein generating the haptic signal comprises:
    acquiring characteristic signals from a database;
    combining the characteristic signals; and
    transmitting the haptic signal to a haptic device, wherein the haptic signal is the combined characteristic signals.

4. The computer-implemented method of claim 3, wherein combining the characteristic signals comprises:
   scaling amplitudes of a characteristic signal corresponding to the proportionality selected by the user; and
   summing the scaled characteristic signals, wherein the sum is a combined wave superposition of the characteristic signals.

5. The computer-implemented method of claim 3, wherein combining the characteristic signals comprises:
   combining one or more characteristic signals, wherein the characteristic signal is selected from a group consisting of: a known textile, a known texture, and custom generated textiles and textures.

6. The computer-implemented method of claim 1, wherein generating a haptic signal comprises:
   acquiring characteristic signals from a database;
   combining the characteristic signals, wherein the combination includes a normalized scaling of amplitudes of the characteristic signals based upon the number of characteristic signals selected by the user, and summing the scaled characteristic signals, wherein the sum is a combined wave superposition of the characteristic signals; and
   transmitting the haptic signal to a haptic device, wherein the haptic signal is the combined characteristic signals.

7. The computer-implemented method of claim 1, wherein generating a haptic signal comprises:
   providing, in the user interface an interactive mode for generating a haptic signal, wherein the interactive mode displays graphical representations using nodes to depict one or more example haptic signals;
   receiving, one or more selections from the user via the user interface, wherein the selection comprises one or more selections of node placements; and
   generating the haptic signal based on the one or more selections of node placements.

8. A computer program product comprising:
   one or more computer readable storage media and program instructions stored on the one or more computer readable storage media, the program instructions comprising:
   program instructions to receive a selection from a user, wherein the selection corresponds to a characteristic signal, wherein the characteristic signals correspond to a texture and a textile of a composition of a fabric;
   program instructions to generate a haptic signal comprising an oscillating low-level electric signal to be emitted by a haptic device, wherein the oscillating low-level electric signal passes between the skin of the user and a conductive surface covered with a thin insulating layer based, at least in part, on the user selection;
   program instructions to present the selection in a user interface having one or more graphical icons the user utilizes to refine the haptic signal, wherein refining the haptic signal further comprises further comprises:
      program instructions to modify the characteristic signal of the selection using the one or more graphical icons; and
   program instructions to generate a recommendation of one or more haptic signals based at least in part on the user-generated haptic signals and a database of characteristic signals, wherein the recommendation includes a list of comparable compositions of fabrics that correspond to the one or more haptic signals.

9. The computer program product of claim 8, wherein the user selection further comprises a corresponding proportionality of the texture and the textile for the characteristic signal.

10. The computer program product of claim 8, wherein the program instructions to generate the haptic signal comprise:
    program instructions to acquire characteristic signals from a database;
    program instructions to combine the characteristic signals; and
    program instructions to transmit the haptic signal to a haptic device, wherein the haptic signal is the combined characteristic signals.

11. The computer program product of claim 10, wherein the program instructions to combine the characteristic signals comprise:
    program instructions to scale amplitudes of a characteristic signal corresponding to the proportionality selected by the user; and
    program instructions to sum the scaled characteristic signals, wherein the sum is a combined wave superposition of the characteristic signals.

12. The computer program product of claim 10, wherein the program instructions to combine the characteristic signals comprise:
    program instructions to combine one or more characteristic signals, wherein the characteristic signal is selected from a group consisting of: a known textile, a known texture, and custom generated textiles and textures.

13. A computer system comprising:
    one or more computer processors;
    one or more computer readable storage media; and
    program instructions stored on the one or more computer readable storage media for execution by at least one of the one or more processors, the program instructions comprising:
    program instructions to receive a selection from a user, wherein the selection corresponds to a characteristic signal, wherein the characteristic signals correspond a texture and a textile of a composition of a fabric;
    program instructions to generate a haptic signal comprising an oscillating low-level electric signal to be emitted by a haptic device, wherein the oscillating low-level electric signal passes between the skin of the user and a conductive surface covered with a thin insulating layer based, at least in part, on the user selection;
    program instructions to present the selection in a user interface having one or more graphical icons the user utilizes to refine the haptic signal, wherein refining the haptic signal further comprises further comprises:
       program instructions to modify the characteristic signal of the selection using the one or more graphical icons; and
    program instructions to generate a recommendation of one or more haptic signals based at least in part on the user-generated haptic signals and a database of characteristic signals, wherein the recommendation includes a list of comparable compositions of fabrics that correspond to the one or more haptic signals.

14. The computer system of claim 13, wherein the user selection further comprises a corresponding proportionality of the texture and the textile for the characteristic signal.

15. The computer system of claim 13, wherein the program instructions to generate the haptic signal comprise:

program instructions to acquire characteristic signals from a database;

program instructions to combine the characteristic signals; and program instructions to transmit the haptic signal to a haptic device, wherein the haptic signal is the combined characteristic signals.

16. The computer system of claim 15, wherein the program instructions to combine the characteristic signals comprise:

program instructions to scale amplitudes of a characteristic signal corresponding to the proportionality selected by the user; and program instructions to sum the scaled characteristic signals, wherein the sum is a combined wave superposition of the characteristic signals.

17. The computer system of claim 15, wherein the program instructions to combine the characteristic signals comprise:

program instructions to combine one or more characteristic signals, wherein the characteristic signal is selected from a group consisting of: a known textile, a known texture, and custom generated textiles and textures.

* * * * *